May 16, 1967    L. B. VINSON ETAL    3,320,342
TAPE-WRAPPING APPARATUS AND METHOD
Filed Dec. 13, 1963    5 Sheets-Sheet 3

INVENTORS:
Leonard B. Vinson,
Charles G. Ewald,
BY Hood, Gust & Irish
Attorneys

INVENTORS:
Leonard B. Vinson,
Charles G. Ewald,
BY Hood, Gust & Irish
Attorneys.

United States Patent Office 3,320,342
Patented May 16, 1967

3,320,342
TAPE-WRAPPING APPARATUS AND METHOD
Leonard B. Vinson, 3025 Willow Oaks Drive 46807, and Charles G. Ewald, 6528 Donna Road 46809, both of Fort Wayne, Ind.
Filed Dec. 13, 1963, Ser. No. 330,390
14 Claims. (Cl. 264—138)

The present invention relates to a tape-wrapping apparatus and method and more particularly to an apparatus and method for wrapping tetrafluoroethylene tape onto threaded nipples.

In the art of conducting fluids through conduits, such as water through pipes and gases through tubing, it is customary to use threaded members for coupling sections of pipe and tubing together. For this purpose, internally threaded sleeves and externally threaded nipples are used, these parts conventionally being somewhat tapered so as to provide a tight seal when the members are threaded together.

For insuring against leakage between members threaded together, it has been quite customary in the prior art to use chemical sealing compositions in paste form which are smeared over the threads prior to their being joined. This method of sealing is being replaced in some instances by the newly discovered polytetrafluoroethylene tape which now conventionally is manually wrapped around the threads of an externally threaded member prior to the latter being screwed into an internally threaded sleeve or the like. Such tape has no adhesive thereon for adhering it to the nipples; however, it does have deforming and stretching characteristics as well as adhering qualities such that upon being wrapped forcefully and intimately into engagement with the threads, it will remain thereon until it is ready for use.

Manually wrapping the tape onto threaded members is time-consuming and somewhat difficult and requires some skill on the part of the individual before he acquires any particular degree of proficiency. Even at best, some substantial period of time is required even by the most skilled in wrapping a nipple such that when it is necessary to wrap a relatively large number of nipples, the cost of labor and the consumption of time become appreciable.

Further than this, in the manual wrapping of nipples it is not unusual for the wrappings to come loose or to be improperly positioned on the nipple.

It is therefore an object of the present invention to provide an apparatus and method for wrapping threaded members with polytetrafluoroethylene tape more quickly, more reliably and more efficiently than has been achieved heretofore.

It is another object of this invention to provide an apparatus which is automatically operable for wrapping tape onto threaded members.

It is another object of this invention to provide a relatively simple method for expeditiously wrapping polytetrafluoroethylene tape onto threaded members.

It is yet another object of this invention to provide an apparatus for wrapping polytetrafluoroethylene tape onto threaded members by means of an arrangement whereby the tape is fed to a nipple during rotation of the latter and automatically severed, any trailing end portions of the tape being also wrapped onto the nipple by continued rotation thereof after the aforementioned severing.

Other objects will become apparent as the description proceeds.

The above-mentioned and other features and objects of this invention and the manner of attaining them will become more apparent and the invention itself will be best understood by reference to the following description of an embodiment of the invention taken in conjunction with the accompanying drawings, wherein.

Figures 9, 10, 11, 12:
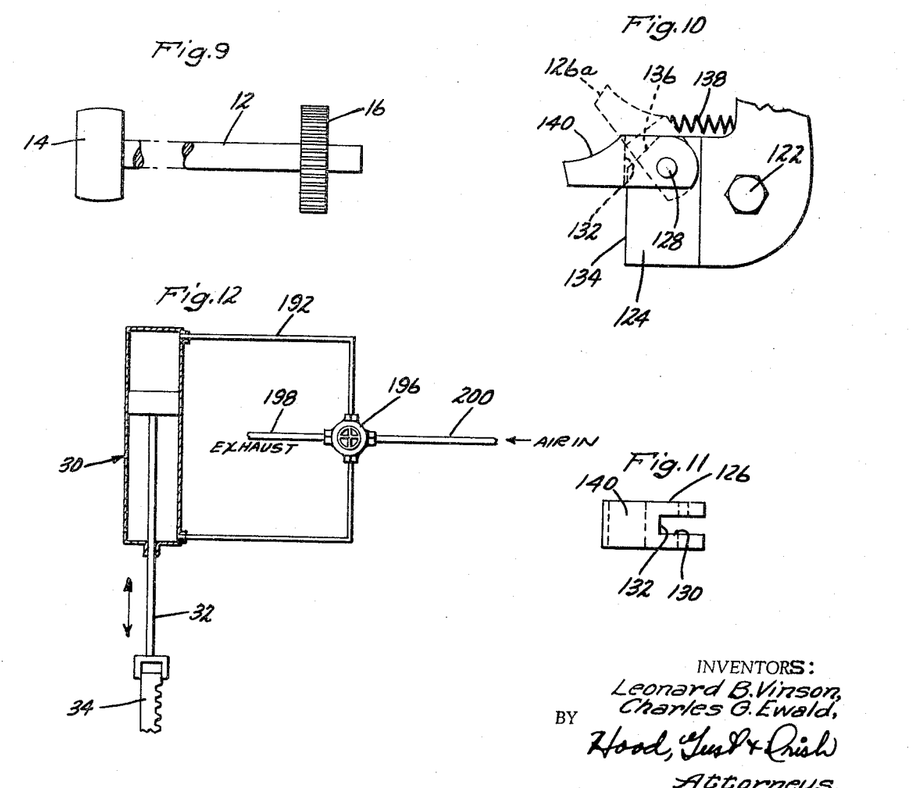
FIG. 9 is a side view of the rubber roller and ratchet portion of the mechanism of the preceding figure.
FIG. 10 is a view of the crank arm portion which operates in conjunction with the gear rack in manipulating the tape-feeding means.
FIG. 11 is a top view of the bifurcated finger shown in side view in FIG. 10.
FIG. 12 is a diagrammatic view of the pneumatic system used in operating the mechanism of the preceding figures.

Referring to the drawings, and more particularly to FIGS. 1–4, the mechanism comprises a frame 10 which, in the illustrated embodiment, is a rectangular piece of one-quarter (¼) inch plate steel. This frame or plate 10 is mounted in an upright position as shown and carries about midway between the upper and lower ends and lateral edge thereof, for rotation, a shaft 12 which carries on one end a rubber roller 14 and on the other end a ratchet wheel 16 (FIG. 9). Both the roller 14 and the ratchet wheel 16 are fixedly secured to the shaft 12 and are rotatable therewith. The roller 14 is located on the front side of the plate 10 while the ratchet wheel 16 is on the rear side.

Rotatably mounted on the shaft 12 and located on the rear side of the plate 10 is a spur gear 18 and supporting disc 20, these two elements 18 and 20 being fixedly secured together for simultaneous rotation. The disc 20 is abutted against the inner side of the ratchet wheel 16 as shown more clearly in FIG. 5 and carries a pawl 22 thereon which is pivoted about a screw 24 for selective engagement with the teeth of the rachet wheel 18. A wire spring 26 secured at one end to a pin 28 on the disc 20 engages one end of the pawl 22 as shown more clearly in FIG. 2 and forces the latter into engagement with the ratchet teeth, such that for one direction of rotation of the spur gear 18 and disc 20 the pawl 22 will cause the ratchet wheel 16 to rotate therewith while in the opposite direction of rotation the pawl will merely slide over the teeth and not produce any rotation of the ratchet wheel 16. As viewed in FIG. 1, the pawl 22 and teeth on the ratchet wheel 16 are arranged such that counterclockwise rotation of the spur gear 18 and disc 20 will produce engagement of the pawl with the ratchet teeth and in turn rotation of the roller 14 in a counterclockwise direction. For a reverse direction of rotation of the spur gear 18 and disc 20, the pawl and ratchet teeth are arranged such that the pawl will slide over the teeth such as to impart no rotation to the roller 14, or in other words permit the roller 14 to remain stationary while the gear 18 and disc 20 so rotate.

It may be mentioned at this point that the material of which the roller 14 is made in a practical working embodiment of this invention is tan or amber pure gum rubber of 40 to 45-durometer. As will appear from the following description, other materials may be used for performing the function of the roller as will be explained in more detail later on.

A double-acting, pneumatic power cylinder indicated generally by the reference numeral 30 is mounted on the top end of the plate 10 with the piston rod 32 thereof being vertical and depending as shown. On the lower end of this piston rod is mounted a yoke 34 to which is secured the upper end of a gear rack 36 which is aligned vertically as shown.

Figure 2:
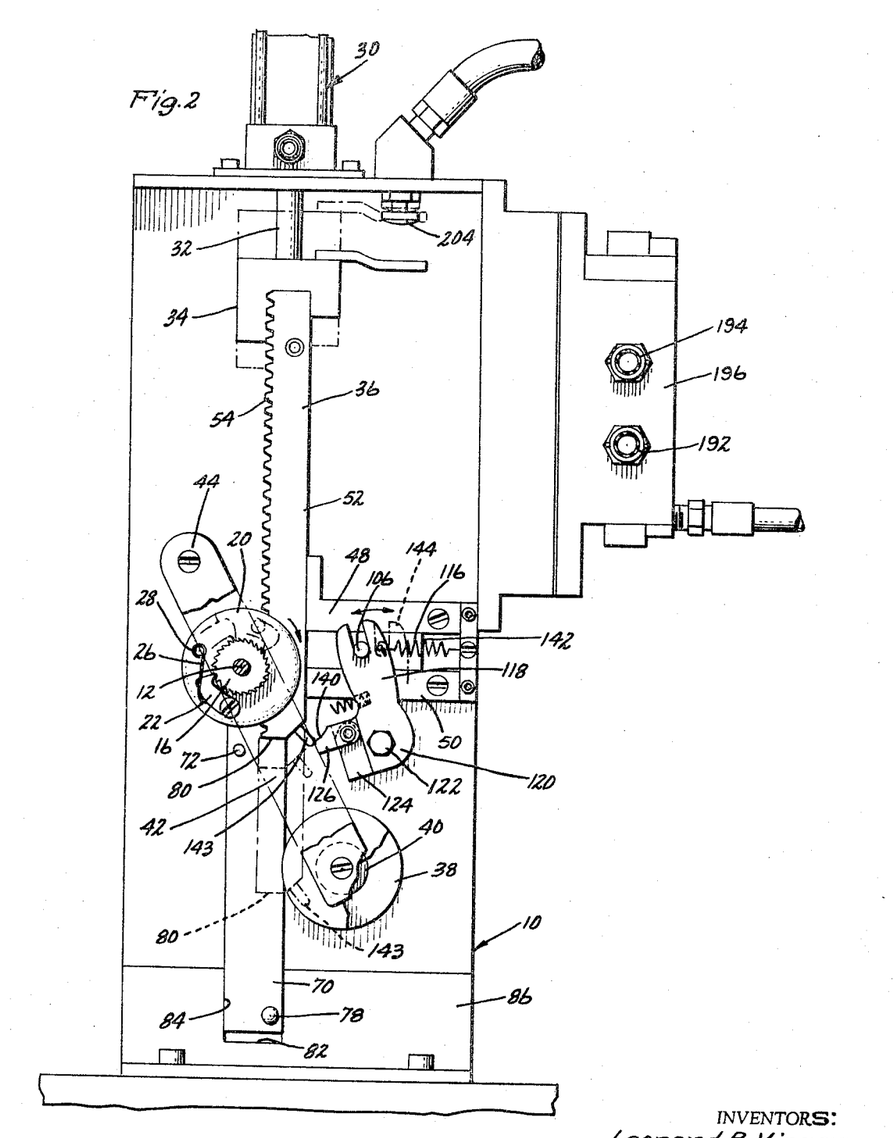
FIG. 2 is a rear view thereof also partly broken away and sectioned for clarity.

On the reverse side (right hand side) of the plate 10 as shown more clearly in FIG. 2 is fixedly mounted a guiding roller 38 having a circumferential groove 40 adapted to receive in lateral guiding relation the rack 36 so as to assist in maintaining the motion of the latter rectilinear. This wheel 38 is supported on a suitable bar 42 secured to but spaced from the plate 10 by means of a screw and spacer assembly 44 and also by a rearward extension of the shaft 12 as indicated by the numeral 46 in FIG. 3.

The wheel 38 is disposed near the bottom of the plate 10 so as to guide the lower end of the rack 36 when the movement thereof coincides with the lower portions of the plate 10.

Also serving to guide the rack 36 for truly vertical rectilinear movement are a pair of elongated blocks 48 and 50 which are fixedly secured to the rear side of the plate 10 and are spaced apart and horizontal as shown in FIG. 2. The left-hand ends of these blocks 48 and 50 (FIG. 2) are made straight and vertical so as to be slidingly engaged by the rear edge 52 of the rack 36. Thus, the rack 36 is guided for vertical reciprocation in its mid-region as well as the lower portion thereof by the members 48 and 50 and the roller 38. The sides of the groove 40 and the roller 38 restrain the gear rack 36 against lateral displacement while the blocks 48 and 50 insure engagement of the rack teeth 54 with the gear 18. Thus, vertical reciprocatory movement of the rack 36 produces corresponding rotation of the gear 18.

A work-supporting spindle or post 56 of cylindrical shape is movably mounted on the front side (left side as viewed in FIG. 3) of the plate 10. This mounting is provided by a slide block 58 which is virtually guided for reciprocatory movement in a gib plate 60 secured to plate 10. A clearance is provided between the bottom edge of the block 58 and the bottom of the gib slot 62 which receives a helical compression spring 64 bearing hereagainst. A stop screw 66 threaded through the lower portion of the gib 60 is engageable with the lower edge of the block 58 for limiting the extent of downward movement of the latter. This spring 64 yieldably urges the block 58, hence the spindle 56, into operative engagement with the roller 14. As shown, the axes of the spindle 56 and roller 14 are parellel and adjacent. The block 58 is so arranged that the spindle 56 can be moved into and out of operative engagement with the roller 14 as will be explained more fully hereinafter. The spindle 56 is conveniently secured to the block 58 by means of the threaded portion 68 as shown more clearly in FIG. 3.

On the rear side (right-hand side as viewed in FIG. 3) of the plate 10 is slidably mounted for vertical reciprocatory movement an abutment block 70 having a transverse pin 72 secured thereto which passes through a vertically elongated opening 74 in the plate 10 and is snugly received by an aperture 76 in the block 58. Thus, vertical movement of the block 70 will result in corresponding vertical movement of the block 58. The slot 74 is made long enough such that the spindle 56 can move into and out of operative engagement with the roller 14 as will be explained more fully hereinafer.

Fixedly mounted on the lower portion of the cam block 70 and transversely extending therefrom is an abutment post 78 which is located in vertical alignment with he rack 36 so as to be engageable with the lower end porion 80 of the rack 36. Thus, when the rack 36 is moved to its lowermost extreme position, the end edge 80 will engage the post 78 and move the block 70 downwardly until the lower extremity of the block 70 engages the bottom 82 of the slot 84 in the stationary frame plate 86. This frame plate 86 is secured to the plate 10 and serves in guiding the block 70 for vertical movement and also in limiting the extent of downward movement of the block 70.

It may now be stated that the two blocks 58 and 70 are vertically movable to an extent which permits the spindle 56 to be moved into and out of operative engagement with the roller 14.

An elongated part-cylindrical member 88 is mounted on the block 58 coaxially around the spindle 56, this member 88 having an inside diameter substantially larger than the outer diameter of the spindle 56. The diametral relationships between these two members is substantially shown to scale in FIG. 6 and further such as to perform the necessary functions as will be explained more fully later on.

A tape-feeding block, indicated by the numeral 90, is rectangular in shape and is fixedly mounted on the front side of the plate 10 in the position shown. The upper horizontal edge of this block 90 is provided with an elongated, horizontally extending groove 92 which is rectangular in cross-section (see FIG. 5). The width of this groove 92 is made to coincide with the width of the plastic tape 94 which is fed therethrough; however, as will appear from the following description, tapes of lesser widths may be used without departing from the spirit and scope of this invention.

Figure 1:
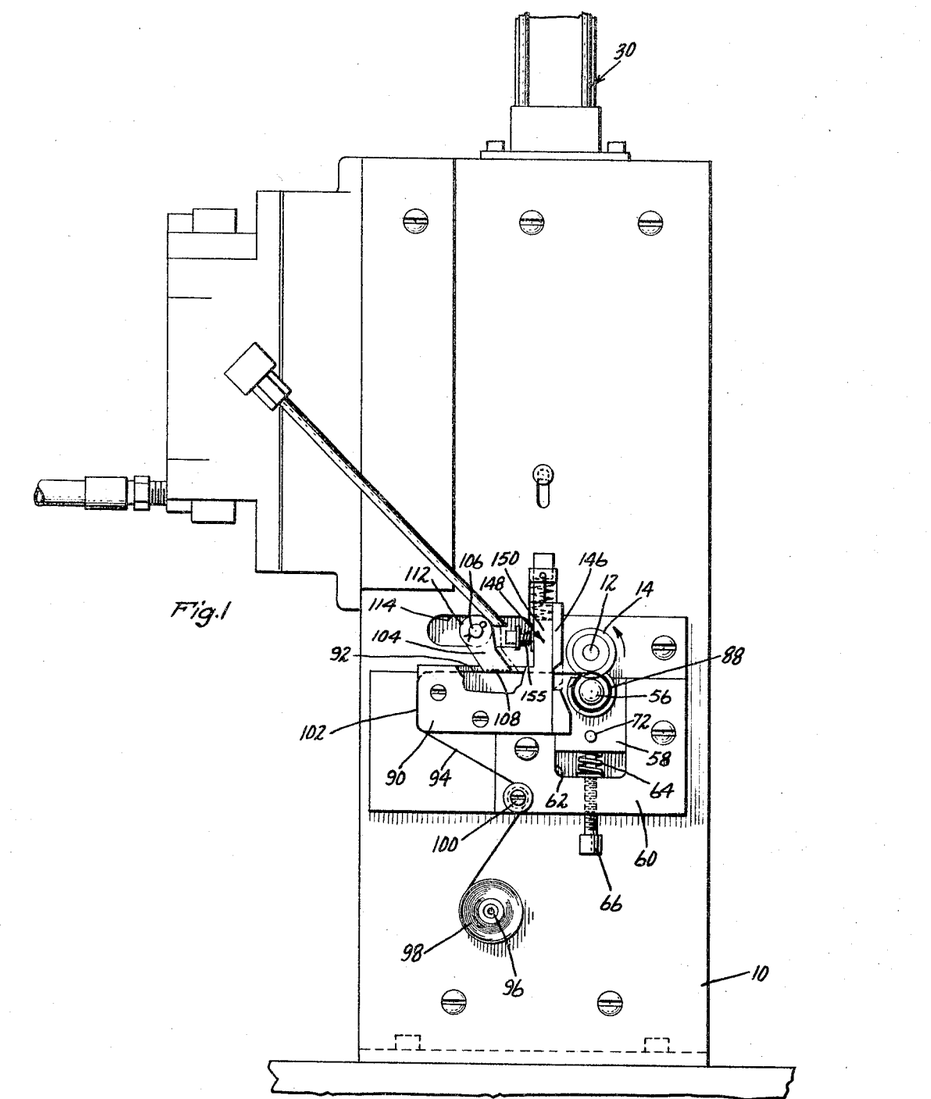
FIG. 1 is a front view, partially broken away and sectioned for clarity, of one embodiment of this invention.

The bottom of the groove 92 is flat and smooth and lies in a horizontal plane which is tangent to the lowest circumferential portion of the roller 14, or in other words is tangent to the circumferential portion of the roller 14 which is operatively engaged with the spindle 56. As shown in FIG. 1, the right-hand end of the block 90 and groove 92 are spaced a short distance from the roller 14 for a purpose which will be explained more fully later on.

A post 96 is secured at one end to the frame plate 10 and mounts for rotation a roll of polytetrafluoroethylene tape 98 of conventional size. In the illustrated embodiment of this invention, the width of the tape on this roll 98 is one-quarter (¼) of an inch, and as will be recalled, the groove will therefore be approximately one-quarter (¼) of an inch or even slightly larger so as to accommodate passage of the tape 94 therethrough.

Figures 5, 6:
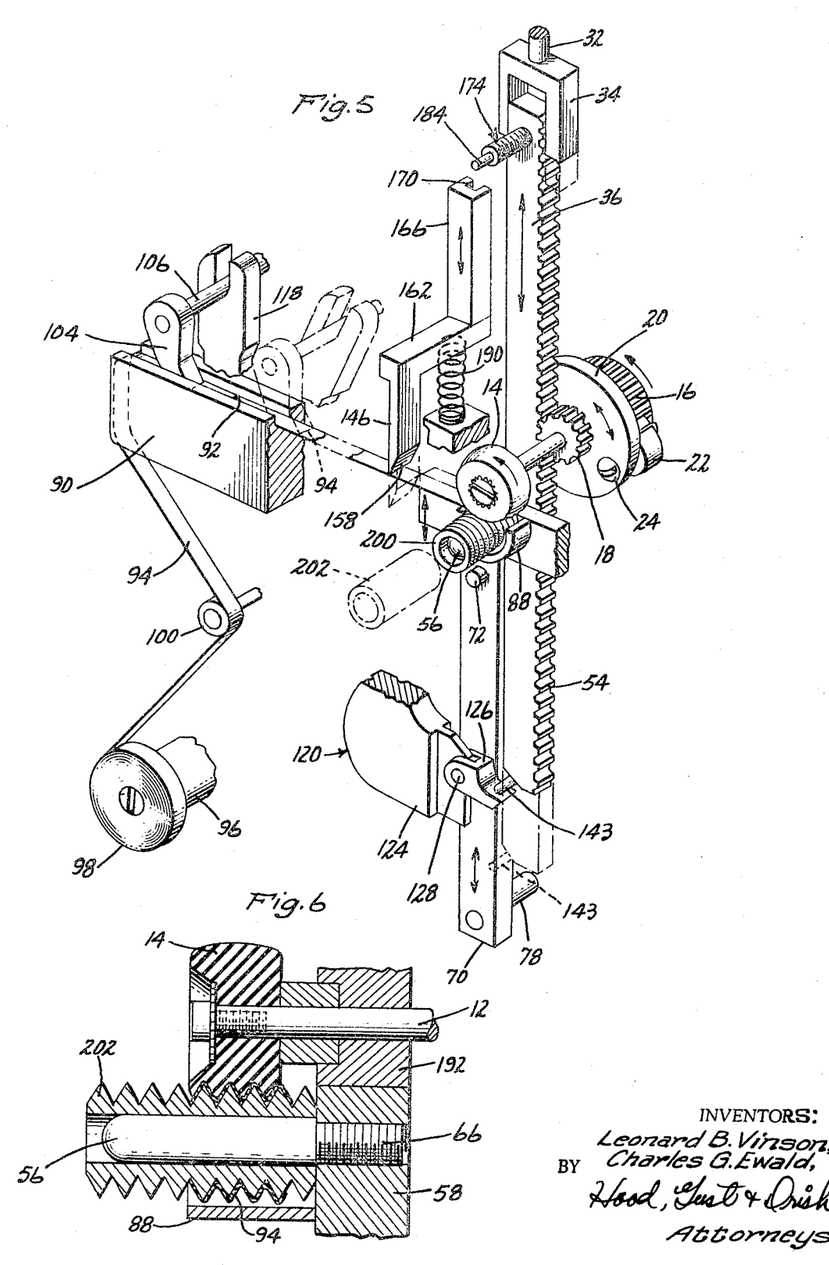
FIG. 5 is an exploded perspective illustration of a portion of the mechanism of the same embodiment.
FIG. 6 is a fragmentary cross-section taken substantially along section line 6—6 of FIG. 4.

The tape from the roll 98 is passed over an idler 100 which is also secured to the frame plate 10 and then rearwardly to pass along the upright vertical edge 102 of the feed-block 90 and then through the groove 92 as shown more clearly in FIG. 6. From the groove 92, the tape 94 proceeds to the point of engagement of the roller 14 with the spindle 56 for a purpose which will be explained later on.

The corners on the feed-block 90 around which the tape 94 must pass are smoothly curved and rounded so as not to present any sharp edges which might cut or fray the tape. All the portions of the feed-block 90 which the tape 94 engages should, therefore, be smooth.

Figure 4:
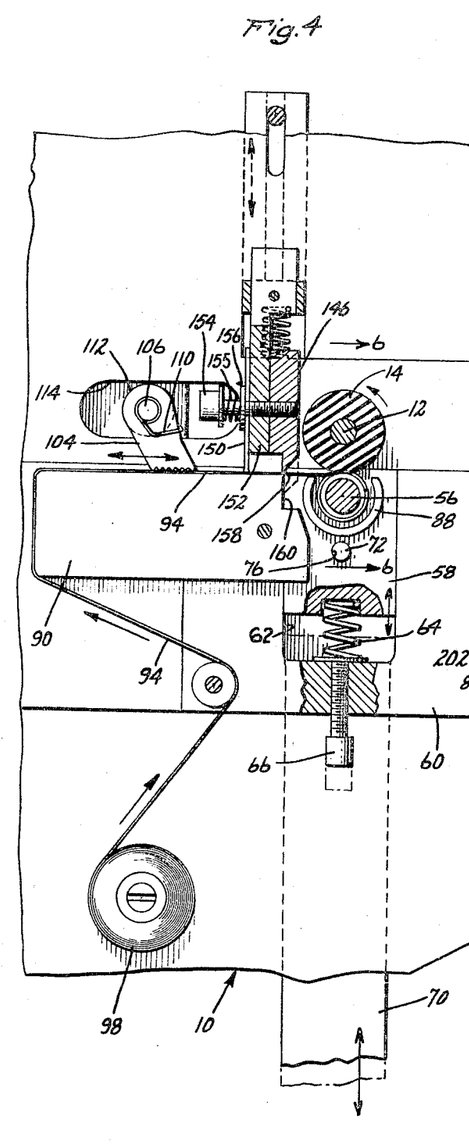
FIG. 4 is a fragmentary front view thereof partially sectioned.

For feeding the tape 94 through the groove 92 is a mechanism which includes a finger 104 pivotally depending from shaft 106. The bottom edge of the finger 104 is serrated as shown at 108 and slidably engages the bottom of the channel 92. Also, the finger 104 is located at an angle as shown in FIGS. 1, 4 and 5, and a spring 110 secured to the shaft 106 is used to bear against the finger 104 to urge the same in a clockwise direction as shown in FIGS. 1, 4 and 5 so as to maintain the finger in yieldable engagement with the bottom of the channel 92.

The shaft 106 passes through a guiding roller 112 received by a horizontal slot 114 in the frame plate 10.

This slot 114 and roller 112 are of substantially the same width and diameter, respectively, such that the roller 112 may slide horizontally therein. The slot 114 is positioned above the channel 92 in parallelism therewith such that the finger 104 may be guided within the channel 92 for at least a portion of the length of the latter, this length being long enough to feed properly the tape 94 to the roller 14 as will be explained more fully later on.

On the back side of the frame plate 10, as shown more clearly in FIG. 2, is located a guide block 116 which is slidably disposed between the gib bars 48 and 50 previously described. These gib bars 48 and 50 are positioned in registry with the slot 114 so as to receive the shaft 106 therebetween. The block 116 is adapted to slide horizontally between these bars 48 and 50.

The shaft 106 is received by a companion aperture in the block 116 and also by the bifurcated arm 118 of a crank 120. This crank is swingably mounted on the frame plate 10 by means of a pin, bolt or the like 122 located at the corner or angle of the crank. Thus, by swinging the crank 120 about its pivot 122, the shaft 106 can be moved horizontally within the slot 114. The bifurcated end of the arm 118 provides a lost motion connection whereby the arcuate movement of the arm 118 can be accommodated in moving the shaft 106 rectilinearly.

The other arm 124 of the crank 120 projects toward the rack 36 and has pivotally mounted thereon a short cam lever 126 which is shown more clearly in FIGS. 10 and 11. This cam lever 126 straddles the arm 124 as shown and is pivotally mounted thereon by means of a suitable pin 128. In order to straddle the crank arm 124, this lever 126 is provided with a groove 130 having a bottom 132 engageable with the end 134 of the arm 124 so as to limit the counterclockwise movement of the lever 126 as viewed in FIG. 10. However, the upper corner of the end 134 is angled inwardly at 136 so as to permit pivotal movement of the lever 126 clockwise to the dashed line position 12a as shown in FIG. 10. Yieldably restraining clockwise pivoting of the lever 126 is a small helical spring 138 secured at its right-hand end to the crank 120 which is free at its left-hand end so as to be engaged by the lever 126 as shown. Normally, the pivotal connection between the lever and the crank is so loose as to permit the lever 126 to gravitate to the full line position shown in FIG. 10.

The upper surface 140 of the lever is curved as shown for a purpose which will be explained more fully later on.

Now referring to FIG. 2, it will be noted that a small pin 143 extends angularly outwardly from the lower extremity of the rack 36 into the proximity of the lever 126. This proximity is such that when the rack 36 is in its uppermost position and then is started downwardly, the end of the pin 142 immediately engages the curved surface 140 of the lever 126 and thereby swings the crank 120 in a counterclockwise direction until continued movement of the rack 36 carries the pin 143 beyond the lever 126. When this latter event happens, a tension spring 142 connected to the crank arm 118 swings the crank 120 clockwise to its retracted, dashed-line position 144 as shown in FIG. 2.

When the rack 36 is moved upwardly, the pin 143 engages the lever 126 and merely swings the latter upwardly to the dashed line position 126a of FIG. 10 so as to permit passage of the pin 143 without moving the crank 122.

Thus, movement of the rack 36 from the uppermost position to the lowermost results in moving the finger 104 (FIG. 1) toward the right and then return. As a consequence of this rightward movement, the tape 94 is fed toward the right (FIG. 1) along the bottom of the channel 92.

After the machine has been operated to wrap tape into a threaded nipple or similar shaped body, it is necessary for the tape to be severed so as to permit removal of the body from the machine and the replacement by another. This cutoff mechanism is shown in FIGS. 1-5 and comprises a knife member 146 vertically slidably mounted on a fixed guide support 148. The guide support 148 is composed of two spaced-apart, upright posts 150 (see FIG. 3) which are secured at the lower extremities thereof to the feeder block 90. A block 152 secured to the knife member 146 slides between the two uprights 150 while a portion of the knife member 146 engages the right-hand edges of the uprights 150 (as viewed in FIG. 1) so as to further guide the knife member 146 for truly vertical sliding movement.

A screw 154 is threaded into the knife member 146 and passes through a clearance opening in the block 152. A washer 156 on the screw 154 engages the left-hand edges of the uprights 150 (as viewed in FIG. 4), a helical compression spring 155, also surrounding the screw 154, bearing against this washer 156 and the head of the screw 154. Thus, the knife member 146 is assembled to the block 152 as well as the two uprights 150. By this means, the knife 146 is capable of being moved vertically. The lower portion of the knife member 146 is provided with a guillotine knife edge 158 which is located immediately adjacent to the front edge 160 of the feeder block 90. The two edges 158 and 160 are so positioned as to be in slight touching engagement as the knife member 146 is operated, and the cutting edge 158 is disposed transversely of the bottom of the channel 92 so as to cut off tape 94 when the knife member 146 is lowered from its illustrated position (FIG. 4).

A cross arm 162 is secured at its left-hand end to the upper end of the knife block 152 (see FIG. 3) and passes through a vertically aligned slot 164 in the plate 10. The right-hand end of this arm 162 is secured to the lower extremity of a cam block 166 which slidably engages the back side of the plate 10. This block 166 is held into engagement with the back side of the plate 10 by means of a screw 169 passing through another vertically aligned slot 168.

Figure 3:
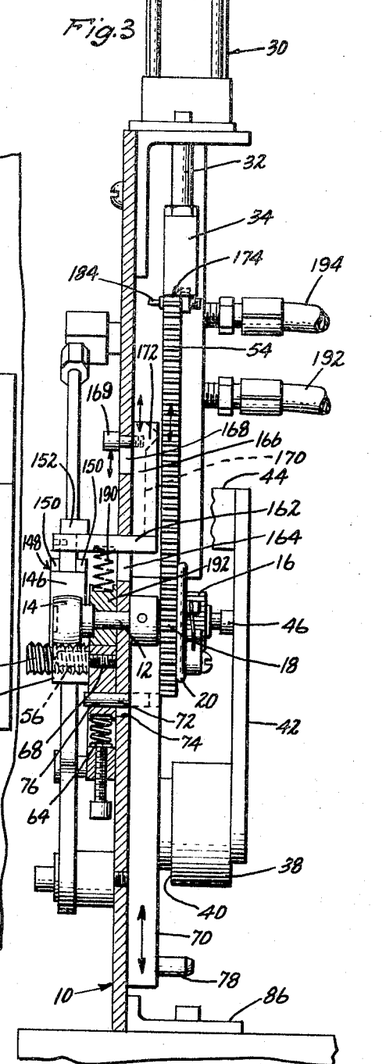
FIG. 3 is an edge view of the same embodiment which is partially sectioned for clarity of illustration.

The cam block 166 is further provided with a vertically aligned slot 170 having the contour shown by the dashed line in FIG. 3. This groove has a raised lobe portion 172 near the upper end thereof which serves a purpose which will be explained more fully later on.

Figure 7:
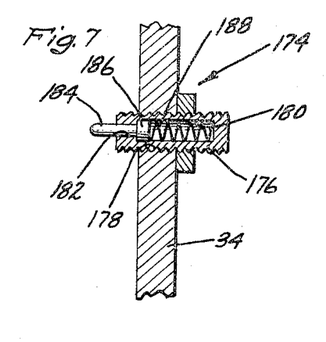
FIG. 7 is a fragmentary sectional illustration of the pin arrangement mounted on the gear rack, which serves in operating the cutoff mechanism.
Figure 8:
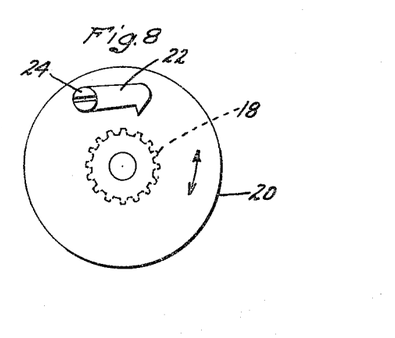
FIG. 8 is a front view of the spur-gear, pawl mechanism used in operating the rubber roller.

To the upper end of the rack 34 is secured a cam-actuating assembly 174 shown in more detail in FIG. 7. This assembly comprises an externally threaded body 176 which is threaded into an opening 178 in the rack 34. This body 176 has a central bore 180 closed at its right-hand end and provided with a reduced diameter bore 182 at its left-hand end. These two bores 180 and 182 reciprocably receive a pin 184 having a head 186. The head 186 engages the shoulder formed between the two bores 182 and 180 thereby limiting the leftward movement of the pin 184. A helical compression spring 188 interposed between the head 186 and the closed, right-hand end of the body 176 yieldably urges the pin 184 leftwardly to the position shown in FIGS. 3 and 7.

This cam assembly 174 is so arranged as to operate the cam block 172 vertically in response to movement of the rack 34. In order to accomplish this, it is necessary that the pin 184 be of such size and position as to engage slidably the groove 170 in the cam block 166.

Referring to FIG. 3, a helical compression spring 190 engages a block 192 secured to the plate 10 and also the cross arm 162 so as to urge yieldably the knife member 146 as well as the cam block 172 upwardly to the position shown. The two slots 162 and 168 will determine the upward limit of this movement.

When the rack 34 is positioned at its upper extreme as shown in FIG. 3, the cam block 166 and the cam assembly 174 occupy the relative positions as shown. As the rack 34 is moved downwardly, the pin 184 will engage the lobe 172 portion of the groove 170, and by reason of the stiffness in the spring 188 (FIG. 7), the block 166 will be moved downwardly with the rack 34. However, when the cross-arm 162 and/or the pin 169 engage the bottom extremities of the slots 164, 168, respectively, the block 166 is stopped in its downward movement. Further downward movement of the rack 34 results in the pin 184 riding over the lobe 172 with the pin 184 thereby moving rearwardly into the body 176. The rack continues the downward movement following passage of the pin 184 by the lobe 176. Obviously, as the block 166 moves downwardly, then the knife member 146 moves downwardly and cuts off the tape 194 as previously explained.

The rack 34 is operated by a power cylinder and pneumatic system diagrammatically shown in FIG. 12. The power cylinder 30 is double-acting, meaning that the piston thereof is operated under power in opposite directions. The cylinder is therefore ported at its opposite ends and has pneumatic lines 192 and 194 connected thereto, as shown. A suitable hand-operated valve 196 is connected to these two lines, this valve providing an exhaust connection 198 and an air pressure inlet connection 200. When the valve 196 is operated in one direction, air under pressure will be admitted to the top side of the cylinder 30 to force the piston downwardly. When the valve 196 is operated oppositely, air under pressure is admitted to the bottom end of the cylinder, forcing the piston upwardly. The side of the piston not having air pressure applied thereto is connected to atmospheric pressure via the exhaust outlet 198 to permit the piston movement.

In explaining the operation of the mechanism thus far described, it will be assumed that a conventional, externally threaded nipple will be wrapped with one or more layers of the tape 94. The starting position for the apparatus is that in which the rack 36 is moved to its extreme down position at which it engages the post 78 and forces the block 70 as well as the spindle 56 downwardly. This results in spacing the spindle 56 from the roller 14 by a distance sufficient to permit slipping the nipple 202 thereover as shown more clearly in FIG. 6. Before the apparatus is actuated, it is made certain that the tape 94 is positioned in the channel 92 with the end of the tape extending toward the right (FIGS. 1 and 4) at least as far as the edge 160 of the block 90.

Now, operation of the valve 196 serves to move the rack 34 upwardly. Immediately, as a consequence of this movement, the spindle 56 is moved upwardly under the force of the spring 64 such that the nipple is engaged with the roller 14. Further upward movement of the rack 34 is accompanied by rotation of the gear 18 and pawl 22. However, this pawl rides over the ratchet wheel teeth such that the roller 14 is not rotated. Also, the pin 143 engages the crank lever 126, swinging the latter upwardly with respect to the crank 120. The crank is therefore not disturbed.

The rack 36 continues in its movement upward until it reaches its upper extreme, at which a valve button 204 is engaged. This results in actuation of the valve 196 oppositely such that the rack 36 is now started in its downward movement. Immediately upon this downward excursion, the gear 18 is turned oppositely such that the pawl 22 engages the teeth of the ratchet wheel. This causes the roller 14 to rotate in a counterclockwise direction as viewed in FIG. 1. Almost simultaneously therewith, the pin 143 on the lower end of the rack 36 engages the lever 126, causing the crank 120 to move counterclockwise as viewed in FIG. 2. This results in feeding the tape 94 forwardly into the point of engagement between the spindle 56 and roller 14. Continued downward movement of the rack 36 continues the rotation of the roller 14 as well as the nipple 202, thereby causing the tape 94 to wrap around the nipple 202. The tape 94 will feed past the finger 104 inasmuch as the latter is inclined toward the right (as viewed in FIG. 1) and the spring 110 is not strong enough to inhibit this movement. This wrapping will continue until the rack 36 has moved downwardly far enough to carry with it the cam block 166 and cause the knife member 146 to cut the tape 94 as previously explained. As soon as the tape is cut, the rack continues for a short distance further in its downward movement, thereby completing the wrapping of the loose end of the tape 94 onto the nipple 202. As the rack 36 ends its downward movement by engagement with the abutment pin 78 and the lowering of the spindle 56 away from the roller 14, the valve 196 is operated to hold the rack in this position. This permits the removal of the nipple 202 with the tape wrapped thereon from the spindle 56. Another nipple may be placed on the spindle and the same wrapped as previously explained.

The finger 104 under the slight force exerted by the spring 110 frictionally engages the tape 94, forcing the same against the bottom of the channel 92. Also, there is a slight frictional force against movement of the tape 94 as it slides around the left-hand end (FIG. 1) of the block 90. This frictional resistance against movement results in the tape 94 being wrapped tightly onto the threaded nipple 202 such that the tape itself stretches slightly and just enough to enter the threads of the nipple as shown more clearly in FIG. 6. By thus being tightly wrapped and stretched, the tape adheres in place such that the nipple can be handled in the usual way without fear of the tape unwrapping. The tape has no adhesive thereon. However, because of its inherent physical and chemical properties, it will remain wrapped on the nipple after the wrapping operation is completed.

Inasmuch as the tape 94 has no adhesive thereon, it is necessary that the end of the tape be held onto the nipple during the starting of the wrapping operation. This holding is accomplished by means of the rubber roller 14 which is sufficiently resilient and pliable as to enter the threads of the nipple 202 as shown in FIG. 6. Thus, with the starting of machine operation, the free end of the tape 94 is fed to the point of contact between the nipple 202 and the roller 14 such that synchronous rotation of these parts results not only in the initial starting and adhering of the tape 94 onto the nipple 202 but also the wrapping of the tape. As the nipple and roller rotate, the roller continues to press the tape downwardly into the threads of the nipple where it remains. This is important in causing the tape to adhere to the nipple.

The various parts of the mechanism as illustrated in FIGS. 1 through 4 are shown substantially to scale. As shown more clearly in FIG. 4, the right-hand end of the feeder block 90, or in other words the edge 160, is spaced slightly from the roller 14 but still is immediately adjacent thereto. Enough clearance is provided for the knife 146 to operate. By providing this close spacing, the free end of the tape can be fed forwardly between the roller 14 and the nipple 202. Also as shown more clearly in FIG. 4, the part-cylindrical casing 88 has its upper edges tangent to the nipple 202 and roller 14 at the point of contact therewith. Thus, the left-hand edge of the part 88 (FIG. 4) serves somewhat as a ledge for guiding the tape onwardly to the nipple 202 and roller 14.

The valve 196 (FIGS. 2 and 12) is a conventional, four-way valve which is in part automatically operable. A manually operable valve or switch first introduces air to the power cylinder 30 when the rack 36 is in its lowermost position, after which the valve 196 takes over and causes the cylinder 30 to operate the rack first to its uppermost position and then downwardly to its lowermost position at which it is stopped. The valve indicated by the numeral 204 serves in reversing the power cylinder 30, this valve 204 being connected to the control valve 196. Thus, the mechanism operates through one full cycle for each manual manipulation of the main control switch or valve for placing a wrapping on a nipple.

While the nipple 202 is illustrated as being tubular and externally threaded, it could have a different external configuration and be used in the present apparatus so long as intimate engagement with the roller 14 can be maintained.

The polytetrafluoroethylene tape 94 on the roll 98 is conventional, and as used in the illustrated and described apparatus is one-fourth (¼) of an inch wide and approximately .003 inch thick. This tape is essentially non-elastic and when tensioned sufficiently, it will stretch and then break. Just prior to breaking, the tape stretches something along the order of taffy candy.

In an operating embodiment of this invention, a roller 14 of three-fourths (¾) inch outside diameter has been successfully used in wrapping tape onto a nipple one-half (½) inch in outside diameter.

Obviously, the mechanism may be altered in dimension to use tapes of different widths, without departing from the scope of this invention.

While there have been described above the principles of this invention in connection with specific apparatus, it is to be clearly understood that this description is made only by way of example and not as a limitation to the scope of the invention.

What is claimed is:

1. Apparatus of the character described comprising a supporting frame, said frame being a plate-like member having opposite sides, a drive roller of soft rubber material fixedly mounted on a shaft, said shaft passing through and being rotatably mounted on said frame, a ratchet wheel fixedly mounted on said shaft, said roller being disposed on one side of said frame and said ratchet wheel being on the other side, a spur gear rotatably mounted on said shaft on the same side of said frame as said ratchet wheel, a disc coaxially fixedly secured to said gear for rotation therewith and for rotation relative to said shaft, a pawl carried by said disc, means yieldably urging said pawl into operative engagement with said ratchet wheel whereby rotation of said gear in a first direction engages said pawl with said ratchet wheel and rotates the latter as well as said shaft and roller therewith and rotation in the reverse direction disengages said pawl from said ratchet wheel and permits said ratchet wheel, shaft and roller to remain stationary, a gear rack mounted on said other side of said frame for reciprocal rectilinear movement between two opposite extreme positions, said gear rack being meshed with said spur gear, a spindle disposed adjacent to and in parallelism with said roller, means mounting said spindle on said frame and urging said spindle into operative engagement with said roller, means on said rack for moving said spindle out of operative engagement with said roller when said rack is in one of its two extreme positions, a feeder block fixedly mounted on said one side of said frame adjacent to but spaced from said roller, said feeder block having a straight elongated guide channel having a flat bottom which lies in a plane substantially tangent to that peripheral portion of said roller adjacent to said spindle, said channel having opposite ends, one of the last-mentioned ends being adjacent to but spaced from said roller, an elongated guide slot in said frame which is adjacent to and extends parallel with said guide channel, a guide bar transversely received by said guide slot and having opposite ends disposed on the opposite sides, respectively, of said frame, one end of said guide bar pivotally carrying a feeding finger which operatively engages the bottom of said guide channel, means yieldably pivoting said finger into engagement with said channel bottom, a crank pivotally mounted on said other side of said frame, said crank having two arms, one of said arms having a lost motion connection with the other end of said guide bar, means yieldably pivoting said crank in a retractile direction which retracts said finger in a direction away from said roller, the other arm of said crank extending toward said rack and being located adjacent to said one end of said rack when the latter is in the other of its two extreme positions, a lever pivotally mounted at one end on said other arm and being pivotable between two opposite positions, said lever having an abutment portion engageable with said other arm to swing said crank in a protractile direction which moves said finger toward said roller, a cam element on said one end of said rack which is engageable with said lever to pivot the latter with respect to said other crank arm when said rack is moved from said one extreme position in a direction toward the other extreme position and to engage said lever with said other crank arm to swing said crank in said protractile direction when said rack is moved from its other extreme position toward said one extreme position, a knife member having a cutting edge, said knife member being mounted for movement on said one side of said frame immediately adjacent to said one end of said guide channel, means guiding said knife member for reciprocatory movement in a direction transverse to the plane of said channel bottom whereby said cutting edge may be passed through said plane in a second plane perpendicular thereto, means yieldably urging said knife member out of cutting relation with said guide channel, a cam block mounted on said other side of said frame for reciprocal movement in a direction parallel to the movement of said knife member, means connecting said knife member to said cam block for concurrent movement therewith, cam-actuating means mounted on said rack for engaging said cam block and moving said knife member in cutting direction across the plane of said channel bottom in response to movement of said rack from said other extreme position toward said one extreme position, said cam-actuating means being located on said rack in a position whereby engagement with said cam block occurs when said gear rack approaches its one extreme position just prior to engagement with said abutment member, and means for reciprocating said rack from said one extreme position to said other extreme position and back to said one extreme position.

2. Apparatus of the character described comprising a supporting frame, a drive roller of rubber-like material rotatably mounted on said frame, means for rotating a roller, work-supporting means for supporting a tubular work-piece for rotation about an axis parallel to said roller and being disposed adjacent to the periphery of said roller, means urging said work-supporting means into operative engagement with said roller, means for moving said work-supporting means out of operative engagement with said roller, means for feeding a ribbon-like tape to a position between said roller and said work-supporting means, the last-mentioned means including means for resisting movement of said tape as it is being wrapped about the aforementioned work-piece, means for severing said tape at a location between said feeding means and said roller after said roller has rotated sufficiently to wrap said tape entirely around said work-piece; said feeding means including a reciprocable element movable toward and away from said roller, and an elongated guide element operatively slidingly engaged by said element, whereby tape interposed between said elements will be advanced toward said roller upon movement of said reciprocable element toward said roller.

3. Apparatus of the character described comprising a supporting frame, said frame being a plate-like member having opposite sides, a drive roller of soft rubber material fixedly mounted on a shaft, said shaft passing through and being rotatably mounted on said frame, a ratchet wheel fixedly mounted on said shaft, said roller being disposed on one side of said frame and said ratchet wheel being on the other side, a spur gear rotatably mounted on said shaft on the same side of said frame as said ratchet wheel, a disc coaxially fixedly secured to said gear for rotation therewith and for rotation relative to said shaft, a pawl carried by said disc, means yieldably urging said pawl into operative engagement with said ratchet wheel whereby rotation of said gear in a first direction engages said pawl with said ratchet wheel and rotates the latter as well as said shaft and roller therewith and rotation in the reverse direction disengages said pawl from said ratchet wheel and permits said ratchet wheel, shaft and roller to remain stationary, a gear rack mounted on said other side of said frame for reciprocal rectilinear movement between two opposite extreme positions, said gear rack being meshed with said spur gear, work-supporting means disposed adjacent to the periphery of said roller, means urging said work-supporting means into operative engagement with said roller, means on said rack for moving said work-supporting means out of operative engagement with said roller when said rack is in one of its two extreme positions, means for feeding tape to said roller in response to movement of said rack, a knife member movably mounted on said frame between said roller and said feeding means, means for moving said knife member in a predetermined direction in response to movement of said rack in a direction from said other extreme position toward said one extreme position, and means for reciprocating said rack from said one extreme position to said other extreme position and back to said one extreme position.

4. Apparatus of the character described comprising a supporting frame, a drive roller of soft rubber material fixedly mounted on a shaft, said shaft being rotatably mounted on said frame, a ratchet wheel fixedly mounted on said shaft, a spur gear rotatably mounted on said shaft, a disc coaxially fixedly secured to said gear for rotation therewith and for rotation relative to said shaft, a pawl carried by said disc, means yieldably urging said pawl into operative engagement with said ratchet wheel whereby rotation of said gear in a first direction engages said pawl with said ratchet wheel and rotates the latter as well as said shaft and roller therewith and rotation in the reverse direction disengages said pawl from said ratchet wheel and permits said ratchet wheel, shaft and roller to remain stationary, a gear rack mounted on said frame for reciprocal rectilinear movement between two opposite extreme positions, said gear rack being meshed with said spur gear, work-supporting means disposed adjacent to the periphery of said roller, means urging said work-supporting means into operative engagement with said roller, means on said rack for moving said work-supporting means out of operative engagement with said roller when said rack is in one of its two extreme positions, a feeder block fixedly mounted on said one side of said frame adjacent to but spaced from said roller, said feeder block having a straight elongated guide channel having a flat bottom which lies in a plane substantially tangent to that peripheral portion of said roller adjacent to said work-supporting means, said channel having opposite ends, one of the last-mentioned ends being adjacent to but spaced from said roller, an elongated guide slot in said frame which is adjacent to and extends parallel with said guide channel, a guide bar transversely received by said guide slot and having opposite ends disposed on the opposite sides, respectively, of said frame, one end of said guide bar pivotally carrying a feeding finger which operatively engages the bottom of said guide channel, means yieldably pivoting said finger into engagement with said channel bottom, a crank pivotally mounted on said other side of said frame, said crank having two arms, means yieldably pivoting said crank in a retractile direction which retracts said finger in a direction away from said roller, the other arm of said crank extending toward said rack and being located adjacent to said one end of said rack when the latter is in the other of its two extreme positions, means on said rack operatively engageable with said other arm for swinging said crank in a protractile direction in response to movement of said rack in a direction from said other extreme position toward said one extreme direction, and means for reciprocating said rack from said one extreme position to said other extreme position and back to said one extreme position.

5. Apparatus of the character described comprising a supporting frame, a drive roller rotatably mounted on said frame, work-supporting means disposed adjacent to the periphery of said roller, means urging said work-supporting means into operative engagement with said roller, means for selectively moving said work-supporting means out of operative engagement with said roller, a feeder block fixedly mounted on said frame adjacent to but spaced from said roller, said feeder block having a straight elongated guide channel having a bottom which lies in a plane substantially tangent to that peripheral portion of said roller adjacent to said work-supporting means, said channel having opposite ends, one of the last-mentioned ends being adjacent to but spaced from said roller, a feeding finger which operatively engages the bottom of said guide channel, means yieldably pivoting said finger into engagement with said channel bottom, means for moving said finger longitudinally in said channel in a direction toward said roller, a knife member mounted on said frame, and means for moving said knife member into cutting engagement with the plane of said channel bottom at a location between said channel and said roller upon predetermined rotational movement of said roller.

6. Apparatus of the character described comprising a supporting frame, a drive roller fixedly mounted on a shaft, said shaft passing through and being rotatably mounted on said frame, said roller being disposed on one side of said frame, a spur gear mounted on said shaft, a gear rack mounted on said other side of said frame for reciprocal rectilinear movement between two opposite extreme positions, said gear rack being meshed with said spur gear, a spindle disposed adjacent to and in parallelism with said roller, means mounting said spindle on said frame and urging said spindle into operative engagement with said roller, means on said rack for moving said spindle out of operative engagement with said roller when said rack is in one of its two extreme positions, means for feding tape to the points of operative engagement between said roller and spindle in response to movement of said rack in a direction from said other extreme position to said one extreme position, a knife member mounted on said frame, means on said rack for moving said knife member into cutting engagement with the plane of said channel at a location between said channel and said roller in response to movement of said rack in a direction from said other extreme position toward said one extreme position.

7. Apparatus of the character described comprising a roll of tape, means for supporting said roll of tape, a body which is rotatable and onto which tape is to be wrapped, means for supporting said body, means for rotating said body, means for positively feeding tape from said roll to said body during rotation of the latter, means for holding said tape against said body during rotation of the latter whereby tape is wrapped thereon, means for terminating the feeding action of said feeding means during rotation of said body and the wrapping of tape thereon, and means for severing the tape wrapped on said body from the tape on said roll, said terminating means including means for maintaining said tape under tension while it is being severed.

8. Apparatus of the character described comprising a supporting frame, a drive roller fixedly mounted on a shaft, said shaft being rotatably mounted on said frame, a spur gear mounted on said shaft, a gear rack mounted on said other side of said frame for reciprocal rectilinear movement between two opposite extreme positions, said gear rack being meshed with said spur gear, work-supporting means disposed adjacent to said roller and being operatively engageable therewith, means on said rack for moving said work-supporting means out of operative engagement with said roller when said rack is in one of its two extreme positions, means for feeding tape to the points of operative engagement between said roller and said work-supporting means in response to movement of said rack in a direction from said other extreme position to said one extreme position, a knife member mounted on said frame, means on said rack for moving said knife member into cutting engagement with the plane of said channel at a location between said channel and said roller in response to movement of said rack in a direction from said other extreme position toward said one extreme position.

9. Apparatus of the character described comprising a supporting frame, a drive roller of soft pliable material rotatably mounted on said frame, means for rotating said roller in a predetermined direction, a work-carrying device on said frame disposed radially opposite the periphery of said roller in spaced relation thereto, means including said device for supporting a cylindrical workpiece of rotation about its axis in a position in which the axis of the latter is substantially parallel to the axis of said roller and the periphery of the work-piece is in engagement with the periphery of said roller, means for moving selectively said device and said roller toward and away from each other in a direction radially of said roller, means for releasably advancing a ribbon-like tape longitudinally toward and between the peripheries of said roller and work-piece, the direction of advancement being substantially parallel to the direction of movement of that portion of the roller periphery which is in engagement with said work-piece, whereby roller and work-piece rotation serves to continue the advancement of said tape, said advancing means including means for releasing the advancing action thereof upon a predetermined degree of rotation of said roller and for maintaining said tape under tension as it is being advanced by said roller and work-piece, and means for severing said tape at a location between said roller and said advancing means after a predetermined degree of rotation of said roller.

10. The apparatus of claim 9 in which said moving means includes means for moving said device into operative engagement with said roller prior to operation of said advancing means and out of operative engagement immediately subsequent to operation of said severing means.

11. The apparatus of claim 9 in which said advancing means includes a stationary surface and a finger in yieldable engagement therewith, means for reciprocating selectively said finger along said surface, and means yieldably urging said finger into engagement with said surface.

12. The method of wrapping tetrafluoroethylene tape onto a threaded member of cylindrical shape comprising the steps of supporting a cylindrical member for rotation, feeding an end of said tape to a portion on the periphery of said member, forcing said tape into intimate engagement with the threaded contour of said member in the area of said portion, maintaining said intimate engagement of said tape with said member in the same spatial position during rotation thereof, rotating said member to wrap the tape thereon, severing the tape being fed to said member from the tape wrapped thereon, said tape being maintained in intimate engagement with said member by means of a roller of resilient deformable material, the softness of said material being such as permits entry of a peripheral portion of said roller into said threads.

13. The method of claim 12 including the step of severing the tape being fed to said member during the time the tape is being wrapped on said member.

14. The method of claim 12 wherein the material of said roller and the degree of entry of the periphery thereof into the threads of said member being such that the initial application of the tape to said member will adhere to said member for rotation therewith instead of adhering to said roller, said member being rotated to an extent that a complete annulus of tape is applied to the threads with said tape being partially overlapped in adhering contiguous relation.

References Cited by the Examiner

UNITED STATES PATENTS

| | | | |
|---|---|---|---|
| 1,379,884 | 5/1921 | Thomas | 18—19 X |
| 1,736,911 | 11/1929 | Gray | 156—187 |
| 2,262,636 | 11/1941 | Cuno | 264—281 X |
| 2,365,952 | 12/1944 | Hanson | 264—281 X |
| 2,424,540 | 7/1947 | Bogoslowsky | 18—19 X |
| 2,487,816 | 11/1949 | Lindsey | 156—185 |
| 2,495,167 | 1/1950 | Horstman et al. | 156—171 |
| 2,539,853 | 1/1951 | Meyers et al. | 156—171 X |
| 2,796,631 | 6/1957 | Stegmann | 18—11 X |
| 3,060,503 | 10/1962 | Eckert | 18—11 X |

WILLIAM J. STEPHENSON, *Primary Examiner.*

ROBERT F. WHITE, *Examiner.*

T. J. CARVIS, *Assistant Examiner.*